(12) United States Patent
Kupsky et al.

(10) Patent No.: US 8,398,889 B2
(45) Date of Patent: Mar. 19, 2013

(54) ELECTROLUMINESCENT ADHESIVE MASSES

(75) Inventors: Marco Kupsky, Kummerfeld (DE); Stefan Zollner, Buchholz/Nordheide (DE)

(73) Assignee: TESA SE, Hamburg (DE)

( * ) Notice: Subject to any disclaimer, the term of this patent is extended or adjusted under 35 U.S.C. 154(b) by 815 days.

(21) Appl. No.: 12/293,482

(22) PCT Filed: Mar. 21, 2007

(86) PCT No.: PCT/EP2007/052706
§ 371 (c)(1), (2), (4) Date: Jul. 24, 2009

(87) PCT Pub. No.: WO2007/107591
PCT Pub. Date: Sep. 27, 2007

(65) Prior Publication Data
US 2010/0032625 A1    Feb. 11, 2010

(30) Foreign Application Priority Data
Mar. 23, 2006 (DE) .......... 10 2006 013 834

(51) Int. Cl.
*C09J 7/02* (2006.01)
*C09J 11/02* (2006.01)
*C09J 9/00* (2006.01)

(52) U.S. Cl. ............ 252/301.36; 252/301.35; 428/917; 428/690

(58) Field of Classification Search ............ 252/301.35, 252/301.36; 428/690, 917
See application file for complete search history.

(56) References Cited

U.S. PATENT DOCUMENTS

| | | | |
|---|---|---|---|
| 2,814,601 A * | 11/1957 | Currie et al. .......... | 528/18 |
| 2,981,858 A * | 4/1961 | O'Connell .......... | 313/502 |
| 3,202,535 A * | 8/1965 | Gaynes .......... | 428/337 |
| 5,789,487 A | 8/1998 | Matyjaszewski et al. | |
| 5,854,364 A | 12/1998 | Senninger et al. | |
| 5,858,495 A | 1/1999 | Eikmeier et al. | |
| 5,945,491 A | 8/1999 | Matyjaszewski et al. | |
| 6,441,551 B1 | 8/2002 | Abe et al. | |
| 6,765,078 B2 | 7/2004 | Husemann et al. | |
| 7,833,437 B2 * | 11/2010 | Fan et al. .......... | 252/301.6 S |
| 2003/0222573 A1 * | 12/2003 | McDonough et al. ........ | 313/503 |
| 2004/0092685 A1 | 5/2004 | Husemann | |
| 2004/0202812 A1 | 10/2004 | Congard | |

FOREIGN PATENT DOCUMENTS

| | | |
|---|---|---|
| DE | 4310082 A1 | 9/1994 |
| DE | 10129608 A1 | 5/2003 |
| DE | 10036901 A1 | 9/2008 |
| EP | 0824110 A1 | 2/1998 |
| EP | 0824111 A1 | 2/1998 |
| EP | 0826698 A1 | 3/1998 |
| EP | 0841346 A1 | 5/1998 |
| EP | 0850957 A1 | 7/1998 |
| EP | 1003354 A1 | 5/2000 |
| JP | 3-207778 | 9/1991 |

OTHER PUBLICATIONS

Prototech Ingredients, Apr. 7, 2005, pp. 1-4.
T.G. Fox, "Influence of Diluent and of Copolymer Composition on the Glass Temperature of a Polymer System", Bull. Am. Phys. Soc. 1, 123 (1956).

* cited by examiner

*Primary Examiner* — Carol M Koslow
(74) *Attorney, Agent, or Firm* — Norris McLaughlin & Marcus PA

(57) ABSTRACT

The invention relates to adhesive masses containing at least one electroluminescent additive, single and double-sided adhesive strips which are provided with adhesive masses of said type, and to the use of said adhesive masses for sticking together electronic components.

20 Claims, 3 Drawing Sheets

ELECTROLUMINESCENT ADHESIVE MASSES

This application is a 371 application of PCT/EP2007/052706 filed Mar. 21, 2007, which claims priority to the German application DE 10 2006 013 834.1 filed Mar. 23, 2006.

The invention relates to pressure-sensitive adhesives (PSAs) and to pressure-sensitive adhesive tapes (PSA tapes) produced therewith.

PSA tapes in the industrial age are widespread processing aids. Particularly for use for electronic applications, especially in the computer industry, the requirements imposed on PSA tapes are very high. As well as low outgassing, the PSA tapes ought to be capable of use within a wide temperature range and ought to meet defined optical properties.

One field of use for advanced PSA tapes is that of adhesive bonding in the equipping of electronic devices with liquid-crystal data displays (liquid-crystal displays, LCDs) which are required, for example, for computers, TVs, laptops, PDAs, cell phones, digital cameras, and the like. For equipping electronic components with such LC displays, a typical procedure is to bond electrical or electronic light sources, LEDs for example, to the LCD module. These light sources serve to illuminate the data displays from the back.

Also known from the electronics industry are electroluminescent components. This electroluminescence may likewise be utilized for the production or incorporation of one-color or multicolor self-illuminating optical display units ("displays"). For this purpose, generally speaking, electroluminescent particles are embedded into a binder matrix, so producing a film which is luminous on electrical excitation. These films can be printed, for example, in order to be used as a display.

Electroluminescent compounds can be stimulated to luminesce by electrical excitation (exposure to an alternating current field). Through suitable combination of chemical materials and luminescence centers, emissions can be induced in virtually all regions of the visible spectrum.

It is an object of the invention to provide alternative PSAs that are suitable more particularly for the production of electronic components. A further object of the invention is to simplify the production of such electronic components.

This object is achieved, surprisingly, by an adhesive of the present invention. Preferred embodiments and developments of the PSA of the invention, and also the preferred use thereof, are subject matter of the dependent claims.

The main claim accordingly provides a pressure-sensitive adhesive (PSA) comprising at least one electroluminescent additive. The term "electro-luminescent additive" refers for the purposes of the invention to chemical substances which are capable of luminescing when located within an electrical field, more particularly within an alternating—and preferably high-frequency—electrical field.

The PSA is therefore able to provide various functions for lighting films, for example: cohesion, on the basis of adhesive strength and cohesive strength; the capacity to emit light; and the provision of a dielectric between two conductive layers. Hence it is possible to simplify the construction of such lighting films as compared with conventional lighting films, which require a separate luminous layer, a separate dielectric, and joining means for the joining of each of the layers.

Electroluminescent additives which can be used include, in particular, commercially customary electro-luminescent pigments. Cited by way of example are the products bearing the designation "GlacierGLO®" from OSRAM Sylvania, which are available in colors such as blue, blue-green, green, orange, and white.

In one preferred embodiment of the invention the PSA is crosslinked, more particularly by chemical or physical means. Although crosslinking does reduce the adhesive strength, which is disadvantageous especially in conjunction with the additional reduction in adhesive strength due to the admixing of the electroluminescent additives, it nevertheless achieves a higher cohesive strength and a greater heat stability on the part of the PSA, as a result of which the PSA is also suitable, in particular, for use as thin layer and at high voltages.

As PSAs to which the electroluminescent additives are admixed (also referred to below as "base PSAs") it is possible—advantageously in respect of the subsequent field of application—in principle to select all PSAs, with particular advantage those having hydrophobic and/or nonpolar properties. Reference is made here, by way of example, to PSAs based on polyacrylate (which for the purposes of this specification is also intended to include polymethacrylate-based adhesives), on polysiloxane, on natural or synthetic rubber and/or on polyurethane, without any wish that this indication should impose any unnecessary restriction. Highly suitable PSAs are also those based on block copolymer, such as acrylate block copolymer PSAs and/or styrene block copolymer PSAs.

The crosslinking of the PSA is dependent on the adhesive system used and may take place by the typical methods known to the skilled worker. Polyacrylate-based PSAs, for example, can be crosslinked with the addition of thermal crosslinkers, such as metal chelates, aluminum chelates or titanium chelates, polyfunctional isocyanates, polyfunctional amines, polyfunctional alcohols or polyfunctional epoxides, for example. Alternatively or in addition the crosslinking may also take place, for example, through the use of UV-absorbing photoinitiators and subsequent UV irradiation, or by means of electron beams.

PSAs based on block copolymer preferably crosslink physically via the formation of what are called hard block domains. With regard to the crosslinking of acrylate block copolymers, reference is made more particularly to the disclosure content of DE 101 29 608 A1.

Silicone PSAs are crosslinked preferably by condensation crosslinking, addition crosslinking or platinum catalysis or free-radically by addition of peroxides. Here as well it is possible, alternatively or in addition, for crosslinking to take place by UV irradiation or by electron beams.

In particular through the crosslinking of the PSA it is possible to obtain PSAs having a high elastic component (in accordance with the microshear test; see below). Having emerged as particularly suitable in this context, despite reduced adhesive strength, is an elastic component of at least 40%. Preferably the elastic component is at least 50%, more preferably at least 60%.

In order to maximize the number of possible different applications of the PSA, provision is made in a preferred embodiment for the PSA per se to be substantially transparent at least in the visible range. As an alternative, provision may be made for the transparency of the PSA to be lowered, particularly insofar as it comprises corresponding additives (optical brighteners, color pigments).

One particularly preferred embodiment of the invention relates to a PSA which is provided with electroluminescent additives and which in turn preferably comprises a polymer formed from a monomer mixture which comprises, in relation to the monomer mixture, (a) a predominant fraction, more particularly 70% to 99.9% by weight, of one or more acrylic esters and/or methacrylic esters having the formula $CH_2=CH(R_3)(COOR_4)$, the radical $R_3$ representing the substituents H and/or $CH_3$ and the radical $R_4$ representing alkyl chains having 4 to 14 C atoms; and (b) 0.1% to 30%, preferably 0.5% to 10%, by weight of one or more olefinically unsaturated monomers having functional groups, more particularly having functional groups which are able to enter into crosslinking, such as acrylic acid, methacrylic acid, hydroxyethyl acrylate, glycidyl acrylate, glycidyl methacrylate or copolymerizable photo-initiators.

The PSA may further comprise one or more components (c) which are copolymerized together with the other components. The comonomers of component (c) may account for up to 40% by weight of the monomer mixture.

The fractions of the corresponding components a, b, and c are preferably chosen such that the copolymer has a glass transition temperature (Tg)≦15° C. The monomers are preferably chosen such that the resulting polymers can be used at room temperature as PSAs, more particularly such that the resulting polymers possess pressure-sensitive adhesion properties in accordance with the "Handbook of Pressure Sensitive Adhesive Technology" by Donatas Satas (van Nostrand, New York 1989, pages 444-514). The glass transition temperature of the polymers on which the PSAs are based is advantageously below 15° C., in the sense of a dynamic glass transition temperature for amorphous systems and the melting temperature for semicrystalline systems, which can be determined by means of dynamic-mechanical analysis (DMA) at low frequencies.

The desired glass transition temperature can be controlled through the application of the equation $$\frac{1}{T_g} = \sum_n \frac{w_n}{T_{g,n}} \quad (E1)$$

in analogy to the Fox equation (cf. T. G. Fox, Bull. Am. Phys. Soc. 1 (1956) 123) in compiling the monomer mixture on which the polymerization is based. In the equation (E1) n represents the serial number of the monomers used, $W_n$ the mass fraction of the respective monomer n (% by weight), and $T_{g,n}$ the respective glass transition temperature of the homopolymer of the respective monomers n, in K.

The monomers of component (a) are more particularly plasticizing and/or nonpolar monomers. Their composition in the monomer mixture is chosen such that the resulting polymers can be used at room temperature or higher temperatures as PSAs, in other words such that the resulting polymers possess pressure-sensitive adhesion properties.

For the monomers (a) it is preferred to use acrylic monomers which comprise acrylic and methacrylic esters with alkyl groups consisting of 4 to 14 C atoms, preferably 4 to 9 C atoms. Specific examples, without wishing to be restricted by this enumeration, are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as 2-ethylhexyl acrylate, 2-ethylhexyl methacrylate, for example.

The monomers of component (b) are, more particularly, olefinic unsaturated monomers (b) with functional groups, more particularly with functional groups which are able to enter into crosslinking. The crosslinking may take place by reaction of the functional groups with themselves, with other functional groups, or after addition of a suitable crosslinking agent.

For the monomers (b) it is preferred to use monomers with the following functional groups: hydroxyl, carboxyl, epoxy, acid amide, isocyanato or amino groups. More particular preference is given to monomers with carboxylic acid, sulfonic acid or phosphonic acid groups.

Particularly preferred examples of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinyl-phosphonic acid, hydroxyethyl acrylate, hydroxypropyl acrylate, hydroxyethyl methacrylate, hydroxypropyl methacrylate, allyl alcohol, glycidyl acrylate, glycidyl methacrylate, 6-hydroxyhexyl methacrylate, N-methylolmethacrylamide, N-(butoxymethyl)methacryl amide, N-methylolacrylamide, N-(ethoxymethyl)acryl-amide, this enumeration not being exhaustive.

Preferred monomers (b) may also contain functional groups which support subsequent radiation-chemical crosslinking (e.g., electron beams, UV) or via peroxides. Suitable copolymerizable photoinitiators are, for example, benzoin acrylate and acrylate-functionalized benzophenone derivatives. Monomers which support crosslinking by electron bombardment or peroxides are, for example, tetrahydrofurfuryl acrylate, N-tert-butylacrylamide, and allyl acrylate, this enumeration not being exhaustive.

In principle it is possible as component (c) to use all compounds with vinylic functionality that are copolymerizable with component (a) and/or component (b), and they may also serve to adjust the properties of the resulting PSA.

Preferred monomers (c), in a nonexhaustive enumeration, are, for example, methyl acrylate, ethyl acrylate, propyl acrylate, methyl methacrylate, ethyl methacrylate, benzyl acrylate, benzyl methacrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethyl-aminoethyl methacrylate, dimethylaminopropylacrylamide, dimethylaminopropylmethacrylamide, N-(1-methylundecyl)-acrylamide, N-(butoxymethyl)methacrylamide, N-(ethoxymethyl)acrylamide, N-(n-octadecyl) acrylamide, and also N,N-dialkyl-substituted amides, such as, for example, N,N-dimethylacrylamide, N,N-dimethylmethyl-methacrylamide, N-benzylacrylamides, N-isopropylacrylamide, N-tert-butylacrylamide, N-tert-octyl-acrylamide, 2-butoxyethyl acrylate, 2-butoxyethyl methacrylate, methyl 3-methoxy acrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethylacrylates, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoro-isopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate.

Acrylonitrile, methacrylonitrile, vinyl methyl ether, ethyl vinyl ether, vinyl isobutyl ether, vinyl acetate, vinyl chloride, vinyl halides, vinylidene chloride, vinylidene halides, vinylpyridine, 4-vinylpyridine, N-vinylphthalimide, styrene, a-methylstyrene and p-methylstyrene, a-butylstyrene, 4-n-butylstyrene, 4-n-decylstyrene, 3,4-dimethoxystyrene, N-vinyllactam, N-vinylpyrrolidone.

Crosslinking takes place only after coating, since, once crosslinked, a polymer has little or no fluidity. For the purpose of crosslinking, either the crosslinking agent can be added prior to coating, or the crosslinking may be accomplished subsequently. Known crosslinking methods are the addition of free-radical initiators, more particularly dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate, or benzpinacol directly prior to coating. These initiators statistically generate free radicals in the main chains of the polymers, and crosslinking points are formed in part with recombination. Where there are reactive groups present such as acrylic acid functions or hydroxyl functions, crosslinking may take place with polyfunctional isocyanates, such as, for example, 4,4'-diphenylmethane diisocyanate (MDI), hexamethylene diisocyanate (HDI), toluene diisocyanate (TDI) or isophorone diisocyanate (IPDI). Polyfunctional epoxide crosslinkers as well are suitable crosslinking reagents. Examples of suitable polyfunctional epoxides are 1,4-butanediol diglycidyl ether, polyglycerol-3 glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether, polypropylene glycol diglycidyl ether, trimethylolpropane triglycidyl ether, bisphenol A diglycidyl ether, and bisphenol F diglycidyl ether.

Likewise possible is crosslinking with glycidyl methacrylate as a comonomer of the acrylic acid ester polymer, a built-in epoxide function, which reacts with hydroxyl functions or acrylic acid to form a network. Crosslinking via epoxides may be accelerated by the presence of a catalyst, examples being Lewis acids such as zinc chloride.

Crosslinking with metal chelates is very widespread, as for example with aluminum acetylacetonate or alkoxides such as titanium alkoxides (titanium tetrabutoxide, for example). In every case these compounds require acrylic acid as a comonomer, forming carboxylates with the polyvalent metal ions.

If UV-absorbing photoinitiators are added to the electroluminescent PSA prior to coating, or if copolymerizable photoinitiators have been incorporated by copolymerization, then crosslinking can also be accomplished by irradiation with UV light. Useful photoinitiators whose use is very effective are benzoin ethers, such as benzoin methyl ether and benzoin isopropyl ether, substituted acetophenones, such as 2,2-diethoxyacetophenone, 2,2-dimethoxy-2-phenyl-1-phenylethanone, and dimethoxyhydroxyacetophenone, substituted α-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)-oxime, for example. One method of crosslinking that operates without crosslinking chemicals is treatment with electron beams, which, in a similar way to the free-radical initiators, statistically generates free radicals along the main chains of the polymer, some of them undergoing recombination to form a network. The activity of crosslinking by UV light and electron bombardment can be improved through the addition of promoters, generally speaking polyfunctional acrylates. The stated mechanisms of crosslinking can also be combined.

The crosslinker fraction or the dose in the case of UV or electron-beam crosslinking is chosen so as to result in an elastic component of at least 40% in the crosslinked PSAs. Preferably the elastic component is at least 50%, more preferably at least 60%. In order to achieve an elastic component of this kind, the crosslinker fraction is preferably 0.1% to 3%, more preferably 0.2% to 2%, very preferably 0.3% to 1%, by weight.

Prior to thermal crosslinking, at least one tackifying resin may be admixed to the polyacrylates obtainable by the process of the invention. Tackifying resins for addition are the known tackifier resins that are described in the literature. With preference it is possible to use pinene resins, indene resins, and rosins, their disproportionated, hydrogenated, polymerized, and esterified derivatives and salts, the aliphatic and aromatic hydrocarbon resins, terpene resins and terpene-phenolic resins, and also C5 resins, C9 resins, and other hydrocarbon resins. Combinations of these and further resins may also be used advantageously in order to adjust the properties of the resultant adhesive in accordance with requirements. Generally speaking it is possible to use all resins that are compatible (soluble) with the polyacrylate in question, reference being made more particularly to all aliphatic, aromatic, and alkylaromatic hydrocarbon resins, hydrocarbon resins based on pure monomers, hydrogenated hydrocarbon resins, functional hydrocarbon resins, and natural resins.

One particularly preferred procedure adds terpene-phenolic resins and/or rosin esters.

Optionally it is possible for the PSAs to have been admixed with plasticizers (plasticizing agents, such as phosphates, phthalates, and citrates, for example), further fillers (such as organic and/or inorganic nanoparticles, fibers, zinc oxide, chalk, hollow or solid glass beads, microbeads of other materials, silica, silicates, organic renewable raw materials (such as wood flour, for example), nucleating agents, thermally conductive materials (such as boron nitride, aluminum oxide, silicon carbide, for example), expandants, compounding agents and/or aging inhibitors (in the form of primary and secondary antioxidants, for example) and/or light stabilizers.

The PSAs may be prepared by methods that are familiar to the skilled worker, with particular advantage by conventional free-radical polymerizations or controlled free-radical polymerizations. The polyacrylates may be prepared by copolymerization of the monomeric components using the typical polymerization initiators and also, where appropriate, regulators, polymerization taking place at the typical temperatures in bulk, in emulsion, such as in water or liquid hydrocarbons, or in solution. The new copolymers are preferably prepared by polymerization of the monomers in solvents, more particularly in solvents with a boiling range of 50 to 150° C., preferably of 60 to 120° C., using the typical amounts of polymerization initiators, which are generally 0.01% to 10%, more particularly 0.1% to 4%, by weight, based on the total weight of the monomers. Suitability is possessed in principle by all typical initiators that are familiar to the skilled worker for acrylates. Examples of free-radical sources are peroxides, hydroperoxides, and azo compounds, examples being dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate, and benzpinacol. One very preferred procedure uses 2,2'-azobis(2-methyl-butyronitrile) (Vazo 67™ from DuPont) or azodiiso-butyronitrile (AIBN) as free-radical initiator. Solvents contemplated are more particularly alcohols, such as methanol, ethanol, n- and isopropanol, n- and isobutanol, preferably isopropanol and/or isobutanol, and also hydrocarbons such as toluene and, more particularly, petroleum spirits with a boiling range of 60 to 120° C. It is further possible to use ketones, such as acetone, methyl ethyl ketone, and methyl isobutyl ketone, and esters, such as ethyl acetate, and also mixtures of solvents of the stated type, preference being given to mixtures containing isopropanol and/or isobutanol in amounts of 3% to 10% by weight, based on the solvent mixture employed.

The average molecular weights $M_w$ of the polyacrylate PSAs additized with the electroluminescent additives are situated very preferably within a range from 20 000 to 2 000 000 g/mol; for further use as hotmelt PSAs, preferably in a range from 100 000 to 500 000 g/mol [The statements of the average molecular weight $M_w$ and the polydispersity PD in this text refer to the determination by gel permeation chromatography. The determination is made on 100 up of sample which has been subjected to clarifying filtration (sample concentration 4 g/l). The eluent used is tetrahydrofuran containing 0.1% by volume of trifluoro-acetic acid. Measurement takes place at 25° C. The precolumn used is a PSS-SDV, 5µ, $10^3$ Å, ID 8.0 mm×50 mm. Fractionation is carried out using the columns PSS-SDV, 5µ, $10^3$ Å and also $10^5$ Å and $10^6$ Å, each of ID 8.0 mm×300 mm (columns from Polymer Standards Service; detection by means of Shodex R171 differential refractometer). The flow rate is 1.0 ml per minute. Calibration takes place against PMMA standards (polymethyl methacrylate calibration)].

Also particularly suitable for the further processing of the invention are polyacrylates which have a narrow molecular weight distribution (polydispersity<4). After crosslinking, these compositions, for a relatively low molecular weight, have a particularly good shear strength. Narrow-distribution polyacrylates can be prepared by anionic polymerization or by controlled free-radical polymerization methods, the latter being especially suitable. Examples are described in U.S. Pat. No. 6,765,078 B2 and DE 10036901 A1 or US 2004/0092685 A1. Atom transfer radical polymerization (ATRP) can be used advantageously to synthesize narrow-distribution polyacrylates, the initiator used preferably comprising monofunctional or difunctional secondary or tertiary halides and, for the purpose of abstracting the halide or halides, complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The different possibilities of ATRP are further described in the specifications U.S. Pat. No. 5,945,491 A, U.S. Pat. No. 5,854,364 A, and U.S. Pat. No. 5,789,487 A.

In a further very advantageous embodiment of the invention, the base PSA is a silicone-based PSA, more particularly a PSA which has been chemically or physically crosslinked. Through free-radical crosslinking in particular it is possible to achieve a significant reduction in the time-dependent aging of the silicone PSA, reflected in increasing cohesion and reduced adhesion. Free-radical crosslinking can in this case be carried out advantageously by chemical means, through the use of BPO derivatives (benzoyl peroxide derivatives), and/or through the use of electron beams.

Very advantageously the silicone PSA exhibits a high level of adhesion to nonpolar substrates and silicone rubbers and/or silicone foams and also to siliconized and/or silicone-containing substrates. With particular preference the crosslinking of the silicone PSA layer is brought about by means of electron bombardment (electron-beam curing, EBC). In particular the EBC crosslinking leads unexpectedly to two directly inter-related advantages. The free radicals generated by the EBC lead on the one hand to crosslinking of the silicone PSA and on the other to the formation of a solid bond between the PSA and the corresponding (nonpolar) substrate to which it is bonded, a PET film, for example. Possible migration of plasticizing reagents in the adhesive bond, and hence an alteration of the properties, is therefore made much more difficult, and so the PSA retains its temperature stability.

As silicone PSAs it is possible with advantage in accordance with the invention to employ condensation-crosslinking systems comprising silicate resins and polydimethyl- or polydiphenylsiloxanes, and also, likewise with advantage, addition-crosslinking systems comprising silicate resins, polydimethyl- or polydiphenylsiloxanes, and crosslinkers (crosslinker substances, more particularly functionalized hydrosilanes).

Certain commercially available examples of silicone PSAs which can be used outstandingly in accordance with the invention, without wishing to restrict the subject matter of the invention as a result of the enumeration, are as follows:

Condensation-crosslinking systems:
DC 280, DC 282, Q2-7735, DC 7358, Q2-7406 from Dow Corning, PSA 750, PSA 518, PSA 910 from GE Bayer Silicones, KRT 001, KRT 002, KRT 003 from ShinEtsu, PSA 45559 from Wacker Silicones, and PSA 400 from Rhodia;

Addition-crosslinking systems:
DC 7657, DC 2013 from Dow Corning, PSA 6574 from GE Bayer Silicones, and KR 3700, KR 3701 from ShinEtsu.

The electroluminescent additives may be introduced as early as during the solvent operation, preferably with use as far as possible of anhydrous solvents, to the mixture of reactants to be polymerized, or into the PSA which is still in solution. The resultant PSA modified with the electroluminescent additives can then be applied directly from the solution to a temporary or permanent carrier material. Subsequently the solvents are removed by drying. Drying takes place preferably at 60-160° C., very preferably at 80-120° C. In the case of thermal crosslinking, the crosslinking reaction is carried out in addition to the removal of the solvents.

In an alternative procedure the electroluminescent additives can also be incorporated homogeneously into the PSA in a hotmelt operation, in the melt. For this purpose, preferably, the solvents are removed in a concentrating extruder and electroluminescent pigments are added by compounding in the solvent-free or low-solvent state. Subsequently the PSA can then be coated from the melt onto a temporary or permanent carrier, for the production of PSA tapes, coating taking place preferably by means of roller or extrusion methods. Coating is carried out, for example, at 140° C. by means of a coating extruder, after which the adhesive is advantageously crosslinked by electron bombardment or UV irradiation.

An upper limit on the amount of electroluminescent additives that can be admixed advantageously is imposed by the technical requirements of the PSA, in other words by the fact that, owing to the high level of filling, the PSA will no longer stick. It has emerged that samples with degrees of filling of up to more than 50% by weight, based on the additized PSA, still exhibit outstanding pressure-sensitive adhesion properties. The amount of electroluminescent additives is therefore chosen advantageously at up to 60% by weight, based on the additized PSA, very advantageously at up to 50% by weight, with very particular advantage at up to 40% by weight.

It has emerged that the fraction of the electroluminescent additives in the PSA, based on the additized PSA, ought to be at least 25% by weight, preferably at least 37.5% by weight, more preferably at least 50% by weight, in order to maximize the luminous power. Unexpectedly, in spite of such a high fraction of the electroluminescent additives, it is still possible to retain sufficient adhesive strength.

A high long-term stability on the part of the PSA and, in association therewith, a low level of fluctuation of the luminous intensity over time necessitates more particularly that the electroluminescent additives be protected from moisture. In a preferred embodiment, therefore, the electroluminescent additive is encapsulated, i.e., it has an external protective shell to protect against moisture. In a preferred embodiment the maximum deviation in illuminance on prolonged storage, i.e., on storage for at least 3 weeks, is not more than ±20%, preferably not more than ±10%, more preferably not more than ±5%.

The levels of illuminance that can be achieved are dependent on the pigment used, on the applied voltage, and on the frequency (the choice of frequency also changes the light spectrum/the "color temperature"), and also, furthermore, on the nature of the PSA. A preferred embodiment envisages that the minimum illuminance at a voltage of 200 V and a frequency of 700 Hz is at least 15 lx, preferably at least 30 lx, more preferably at least 70 lx.

It may additionally be of advantage to admix optical brighteners to the PSA as well. Advantageously the brighteners are added with a degree of filling of up to 5% by weight to the PSA. The use of optical brighteners allows the visual appearance to be improved (more uniform luminous image). In a favorable procedure it is possible by this means to reduce the amount of electroluminescent additives that are necessary for a defined illuminance, by substitution with adjuvants that are often more cost-effective. Optical brighteners which can be used include, more particularly, stilbene derivatives, ethylene derivatives, coumarin derivatives, naphthalimide derivatives or pyrazole derivatives. These may be added to the PSA in pure form or as a mixture of different optical brighteners.

"Optical brighteners" are compounds or compositions which absorb light in the UV range and have a fluorescent emission in the visible range, preferably in the range from about 400 nm to about 500 nm. This emission overlaps with absorption occurring in the range, with the result, overall, that more light is reflected in the range (normal reflection+fluorescent light). The materials with optical brighteners of this kind appear brighter.

Alternatively or in addition to the optical brighteners it is also possible to admix color pigments to the PSA. The color pigments absorb light of defined wavelength and can therefore be used as filters for corresponding wavelengths. Furthermore, the color pigments act as centers of scattering for light and hence contribute to a more uniform luminous image. The degree of filling of the color pigments is preferably up to 5% by weight. The color pigments as well are used to improve the optical appearance (more uniform luminous image). Color pigments used may be more particularly azo pigments, mineral color pigments or tea color pigments and also mixtures of different color pigments. Suitable color pigments are more particularly zinc oxide, titanium dioxide, silicon dioxide and/or zirconium dioxide.

The invention further provides adhesive tapes which are equipped with the PSA of the invention. Adhesive tapes in the sense of the invention ought to be understood as encompassing all sheetlike carrier structures that are coated on one or both sides with adhesive, and also sheetlike layers of adhesive without carrier; in other words, not only conventional tapes (long sheetlike structures which are narrow in relation to their length) but also labels, sections, diecuts, two-dimensionally extended structures, and the like.

In the simplest case it is possible to realize two-sidedly adhesive tapes (layers or films of adhesive) which are composed merely of a single layer of the PSA of the invention (without permanent carrier) and which advantageously—for greater ease of handling—may be placed temporarily onto a temporary carrier. Carrierless pressure-sensitive adhesive layers comprising the inventive PSA may also be realized by means of two or more layers, laminated to one another, of the inventive PSA, or of the inventive PSA and one or more further PSAs.

Figure 1:
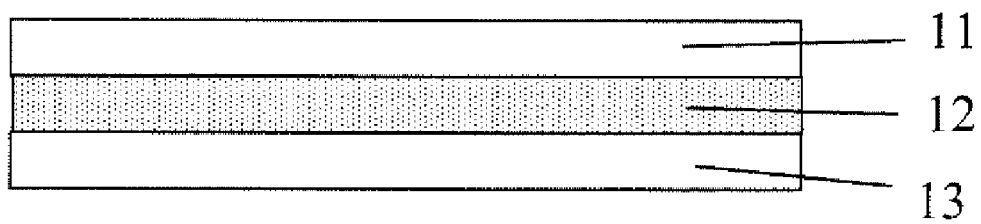
FIG. 1 shows a double-sided luminescing system comprising the pressure sensitive adhesive of the present invention.

These—more particularly single-layer—layers of adhesive are placed advantageously between two electrically conductive, optically transmissive substrates that serve for contacting of the electroluminescent PSAs. Examples of suitable such electrically conductive, optically transmissive substrates are ITO films (ITO=indium tin oxide). A double-sidedly luminescing system is obtained [see FIG. 1; 11=electrically conductive, optically transmissive system; 12=electroluminescent PSA, 13=electrically conductive, optically transmissive system]. As an example of commercially available ITO films, mention may be made here of the ITO films from the company CPFilms Ltd., more particularly of those bearing the product designation OC50.

Figure 2:
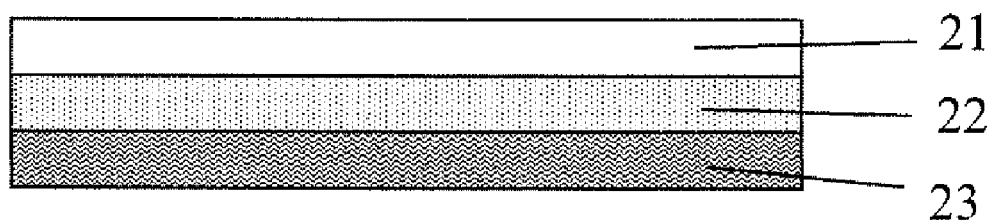
FIG. 2 shows a single-sided luminescent product comprising the pressure-sensitive adhesive of the present invention.

In a second, advantageous embodiment the electroluminescent PSA is provided on one side with an electrically conductive, optically transmissive substrate (chosen more particularly from those already stated above), while on the other side there is an electrically conductive substrate which in particular is optically reflecting. In this way it is possible to realize single-sidedly luminescent product constructions of enhanced luminosity (see FIG. 2: 21=electrically conductive, optically transmissive system; 22=electroluminescent PSA; 23=electrically conductive, optically reflecting system). As electrically conductive, optically reflecting systems it is possible with advantage to make use, for example, of metal foils, such as aluminum foils or the like.

The invention further provides for the use of electroluminescent PSAs, more particularly electro-luminescent pressure-sensitive adhesive films, and especially single-layer, carrierless PSA layers, for the adhesive bonding of components in the electronics industry. For this purpose it is possible to use all of the adhesive tapes set out within the confines of this specification.

This field of use is especially advantageous if the components to be bonded are to be backlit, as may be advantageous in the case, for example, of optical display units (displays). In that case it is no longer necessary to make the display—or the particular component to be bonded—self-illuminating or to integrate additional lighting units into the electronic element which contains the display or the component; instead, the PSA is able to integrate the function of promoting adhesion between the components to be bonded, and the lighting function. A further advantage arises out of the fact that the PSA—very particularly in the form of a carrierless layer—can be used in a geometrically flexible form. Hence it is possible to bond components of different geometries and at the same time to utilize the functionality advantage set out above. Thus, for example, it is possible to compensate unevennesses in the surfaces of the substrates to be bonded and so to prevent optical defect sites, of the kind that may result, for example, when self-illuminating films are bonded to uneven substrates.

Besides the aforementioned adhesive bonding of displays, as for example in cell phones, PDAs, computers and monitors, and entertainment electronics devices (such as extra-large TVs), further fields of use for the PSAs of the invention are the adhesive bonding of safety installations (especially those which are backlit), such as emergency lighting systems and information signs in public buildings (e.g., hospitals) and means of transport (e.g., aircraft), and also use in the automotive sector, as for example in the area of dashboard lighting and of door lighting systems.

It is possible, furthermore, for the PSA of the invention or a corresponding adhesive tape, for example, for lighting purposes in the case of light-up switches, direction markers (escape routes, walkways, roadways), garage or basement lighting systems with moderate light, nightlamps as direction-finding aids, lighting and marking of safety installations (safety masks, emergency exits), lighting systems for traffic guidance (traffic signs, buoys).

The PSA of the invention is suitable, furthermore, for use for light-up sports equipment (bowls and balls, rackets, sticks, clubs, and bats) and toys (slot cars), light-up textiles, interior lighting of containers and bags, as a glare-free reflector lamp, for light-up greeting cards, for "electronic" paper (for menus, for example), for decorative purposes (trade fair construction, gastronomy) in the form, for example, of light-up curtains, room dividers or light-up cables. Further fields of application are the lighting of aquariums, elevators, marquees, and tents, garden lighting, underwater lighting, and the lighting of furniture and drawers.

For the purpose of contacting, the substrates to be bonded ought to be electrically conductive. Where appropriate it may be necessary to impart electrical conductivity to the substrates to be bonded and/or to the substrates to which bonding is to take place. The corresponding imparting of conductive properties may be accomplished, for example, by metallization (by means of sputtering, for example). A more advantageous procedure is the introduction of electrically conductive layers or coatings that are transparent to visible light, such as ITO or FTO layers or coatings (ITO=indium tin oxide, FTO=fluorine-doped tin oxide), for example. Coating may take place by procedures that are familiar to the skilled worker. The aforementioned materials have the advantage of being both transparent and electrically conductive. At the same time these layers have a high infrared reflection capacity.

Through the application of an alternating voltage, preferably a voltage in the range from 50 to 300 V, to the electrically conductive substrates that serve as electrodes and between which the PSA is located, the electroluminescent additives are subject to an alternating electrical field and in this way are excited to luminesce. The aforementioned voltage range may also be undershot or exceeded, however, for certain fields of application in particular. Thus for very thin PSA layers it may be advantageous, for example, to generate, using voltages of less than 50 V, a field strength which is sufficient for luminescence, whereas for particularly thick pressure-sensitive adhesive layers and for three-dimensional bodies formed from the PSA, very high voltages, in other words voltages of more than 300 V, may be advantageous in order to bring about a desired illuminance.

The alternating electrical field for generating the luminescence advantageously has a frequency of 40 Hz to 3000 Hz, more advantageously between 200 Hz and 2000 Hz, more advantageously still between 350 Hz and 1000 Hz. In a further advantageous procedure an alternating field with 50 Hz is chosen. Thus, for example, it is possible to operate at 230 V/50 Hz, in other words at the voltage and frequency that are typical in European power networks, in order to be able to do without the use of frequency converters. A further advantageous alternative, referred to by way of example, is the choice of 110 V/60 Hz (United States power network).

Further embraced by the concept of the invention are adhesive tapes which are furnished on one or both sides with the PSA of the invention and for which, furthermore, a permanent carrier is intended more particularly. In this way it is possible, for example, to realize two-layer (carrier layer, PSA layer) and three-layer (PSA layer, carrier layer, PSA layer) adhesive tape product constructions. It is advantageous more particularly if the permanent carrier is made electrically conductive.

As the base PSA it is possible with great advantage to use a transparent PSA, in order to be able to make optimum use of the illuminance of the electroluminescent additives. In the case of product constructions where a carrier layer has been furnished with the PSA, it is advantageous to make the carrier layer light in color or, more particularly, reflecting, in order to intensify the luminous effect still further.

In principle there is no upper limit on the pressure-sensitive adhesive layers in terms of their thickness. The generation of luminescence for layers of different thickness is dependent on the strength of the electrical field. If the field is strong enough, the electroluminescent additives can be excited to luminesce even in very thick PSA layers or else in three-dimensional structures comprising the PSA of the invention. The stronger the alternating electrical field that is chosen, the thicker it is possible to make the PSA layer. Thus it is possible to make electroluminescent configurations of pressure-sensitive adhesive layers varying from infinitely thin through to very thick.

In a preferred embodiment the thickness of a pressure-sensitive adhesive layer of the invention is between 20 μm and 200 μm, preferably between 50 μm and 100 μm. Within this layer thickness range it is possible to obtain good values for the luminescence with voltages typical of those in power networks, without the pressure-sensitive adhesive layer becoming too hot and, consequently, its durability being adversely affected.

EXAMPLES

For the purpose of further documentation of the invention, a number of sample specimens (also: "specimens") were produced and investigated, with the choice of the PSAs and sample parameters having no unnecessarily restrictive effect on the concept of the invention.

Preparation of a Base PSA (Polyacrylate-Based)

A 2 l glass reactor conventional for free-radical addition polymerizations was charged with 20 g (5% by weight) of acrylic acid, 80 g (20% by weight) of methyl acrylate, and 300 g (75% by weight) of 2-ethylhexyl acrylate and also with 266 g of solvent mixture [acetone/special boiling point spirit 60.95/isopropanol (47:50:3)]. After nitrogen gas had been passed through the reaction mixture for 45 minutes with stirring, the reactor was heated to a temperature of 58° C. and 0.2 g of 2,2'-azobis(2-methylbutyronitrile) [tradename Vazo 67™, DuPont] was added. Subsequently the external heating bath was heated to a temperature of 75° C. and the reaction was carried out constantly at this temperature. After a reaction time of one hour a further 0.2 g of 2,2'-azobis(2-methylbutyronitrile) was added. Further 100 g portions of the solvent mixture were added for dilution after 4 and 8 hours. For the purpose of reducing the residual initiators, a portion of 0.6 g of bis(4-tert-butylcyclohexanyl)peroxy-dicarbonate [tradename: Perkadox 16™, Akzo Nobel] was added after 8 hours and again after 10 hours. The reaction was terminated after 24 hours and the reaction mixture was cooled to room temperature. Subsequently the polyacrylate was blended with 0.3% by weight of aluminum(III) acetylacetonate (added as a 3% strength solution in acetone) (proportional figure based on the polymer).

Preparation of the PSAs Provided with Electro-Luminescent Pigments

The PSA prepared as above was mixed with electroluminescent pigments, with the following degrees of filling (proportional figures based on the additized PSA):

pure base PSA (sample for comparison): PSA 0
25% by weight GlacierGLO® GG43: PSA 1
37.5% by weight GlacierGLO® GG43: PSA 2
50% by weight GlacierGLO® GG43: PSA 3

GlacierGLO® GG43: copper-activated zinc sulfide (manufacturer's data: zinc sulfide: copper activated; composition: zinc sulfide (CAS 1314-98-3) at 92% to 95%; aluminum oxide hydroxide (CAS 24623-77-6) at 5% to 8%).

To produce the sample specimens for the individual measurements, the above-described pressure-sensitive adhesives, PSA 0 to PSA 3, were coated onto the appropriate substrate (carrier) with a thickness of 50 μm, dried, and crosslinked at 120° C. for 15 minutes.

Sample Specimens for Tests A, B, C1, and C2

To produce the sample specimens for analysis for tests A, B, C1, and C2, the substrate (carrier) chosen was a standard polyester carrier having a thickness of 23 μm. Adhesive tape samples were produced using the pressure-sensitive adhesives PSA 0, PSA 1, PSA 2, and PSA 3 (corresponding sample specimens M 0, M 1, M 2, and M 3).

180° Bond Strength Test (Test A)

A strip of the respective sample specimen (adhesive tape), 20 mm wide, was applied to steel plates. The steel plates had been wiped four times with acetone beforehand and left standing in the air for at least 1 minute but not more than 10 minutes. The pressure-sensitive adhesive strip was pressed onto the substrate ten times using a roller weighing 4 kg. Thereafter the adhesive tape was immediately peeled off from the substrate at 300 mm/min and at an angle of 180°. The results are reported in N/cm and are averaged from three measurements. All measurements were conducted at room temperature.

In a similar way the bond strength on PE was ascertained. The defined adhesion substrate used (bond strength plate) was a polyethylene plate produced as a test plate by injection molding from Basell's Hostalen GC7260 HDPE pellets. Prior to a measurement, this plate was cleaned with ethanol and left to stand in the air for at least 2 hours. A strip of the respective sample specimen (adhesive tape), 20 mm wide was pressed onto the substrate ten times using a roller weighing 4 kg. Immediately thereafter the adhesive tape was peeled from the substrate at a speed of 300 mm/min and an angle of 180°, and a measurement was made of the force required to achieve this at room temperature. The measurement figure (in N/cm) resulted as the average from three individual measurements. For the calibration of the measurement method a commercial test adhesive tape for the testing of non-adhesive coatings (tesa 7475 from tesa AG; bond strength on steel according to specification: 31.25 N/25 mm) was investigated in accordance with this measurement method; the bond strength found on the polyethylene test plate was 4.5 N/cm.

Holding Power (Test B)

A strip of the respective sample specimen (adhesive tape) 13 mm wide was applied to the steel plate. The steel plates had been wiped four times with acetone beforehand and left to stand in the air for at least 1 minute but not more than 10 minutes. The area of application was 20 mm*13 mm (length*width). Subsequently the adhesive tape was pressed onto the steel substrate four times by means of a roller with a weight of 2 kg. A 1 kg weight was affixed to the adhesive tape. The holding powers measured are reported in minutes and correspond to the average from three measurements. The measurement is conducted under standard conditions (23° C., 50% relative humidity; DIN 50014-23/50-1) and also at 40° C. and at 70° C. in a thermal cabinet.

Microshear Test and SAFT (Shear Adhesive Failure Temperature) Test (Tests C)

This test serves for accelerated testing of the shear strength of adhesive tapes under temperature load. Sample preparation for microshear test and SAFT:

An adhesive tape (length approximately 50 mm, width 10 mm) cut from the respective sample specimen is adhered to a steel test plate, cleaned with acetone, in such a way that the steel plate protrudes beyond the adhesive tape to the right and left and the adhesive tape protrudes beyond the test plate by 2 mm at the top edge. The bond area of the sample in terms of height×width is 13 mm×10 mm. The bond site is subsequently rolled over six times using a 2 kg steel roller at a speed of 10 m/min. The adhesive tape is reinforced flush with a stable adhesive strip which serves as a support for the travel sensor. The sample is suspended vertically by means of the test plate.

Microshear Test (Test C1):

The sample specimen for measurement is loaded at the bottom end with a weight of 100 g. The test temperature is 40° C., the test duration 30 minutes (15 minutes' loading and 15 minutes' unloading). The shear travel after the predetermined test duration at constant temperature is reported as the result in μm, as both the maximum value ["max"; maximum shear travel as a result of 15-minute loading] and as the minimum value ["min"; shear travel ("residual deflection") 15 min after unloading; on unloading there is a backward movement as a result of relaxation]. Likewise reported is the elastic component in percent ["elast"; elastic component=(max−min)*100/max].

SAFT (Test C2):

The sample specimen for measurement is loaded at the bottom end with a weight of 50 g. The steel test plate with the adhered sample specimen is heated to the final temperature of 200° C., beginning at 25° C. and at a rate of 9° C. per minute. A measurement is made of the slip travel of the sample specimen ("SAFT shear travel") by means of the travel sensor, as a function of temperature and time. The maximum slip travel is set at 1000 μm; if this figure is exceeded, the test is discontinued.

Illuminance (Test D)

The illuminance (in lux, lx) is a measure of the brightness of the electroluminescent PSAs.

Figure 3:
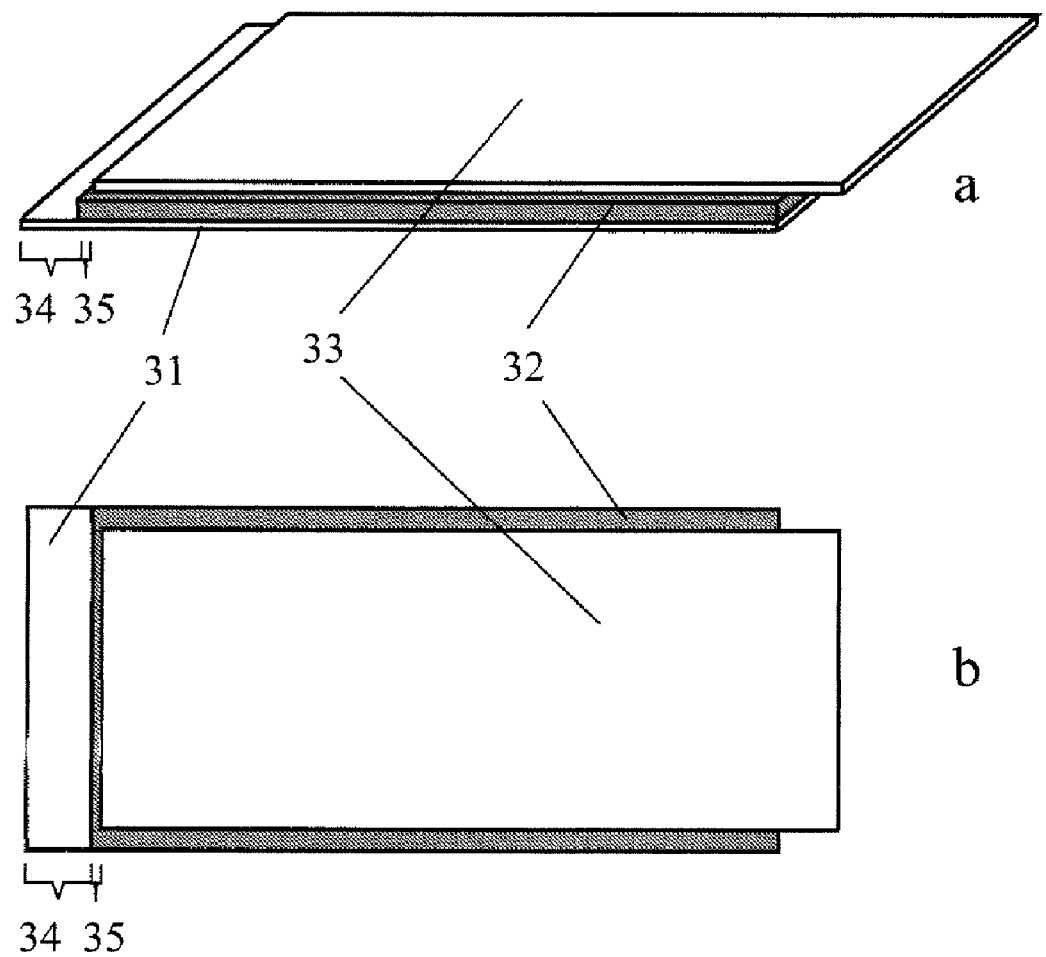
FIG. 3 shows an adhesive film comprising the pressure-sensitive adhesive of the present invention.

The pressure-sensitive adhesives under analysis (PSA 1 to PSA 3) were coated onto a release paper substrate (carrier) at a coat rate of 50 um, were dried and crosslinked (120° C., 15 min), and then were transferred by lamination to a 10.5 cm*5.4 cm ITO film (OC50, CPFilms), thus leaving a 1 cm wide, uncoated edge region for contacting on one of the short sides. With an offset of 1 mm, a second ITO film (likewise OC50, CPFilms), measuring 10.5 cm*4.5 cm, was laminated onto the other side of the PSA layer. For illustration, see FIG. 3, a=perspective view, b=plan view; the reference numerals have the following meanings: 31=first (bottom) ITO film (10.5 cm*5.4 cm), 32=PSA layer (sample), 33=second (top) ITO film (10.5*4.5 cm), 34=edge region of the bottom ITO film for contacting, 35=offset of the top ITO film on the PSA layer.

Three identical sample specimens were produced from each of the pressure-sensitive adhesives PSA 1, PSA 2, and PSA 3 (see listing below).

25% by weight GlacierGLO® GG43:
  specimens M 1.1, M 1.2, M 1.3
37.5% by weight GlacierGLO® GG43:
  specimens M 2.1, M 2.2, M 2.3
50% by weight GlacierGLO® GG43:
  specimens M 3.1, M 3.2, M 3.3

The nine sample specimens produced immediately beforehand ("fresh"), and also samples stored in accordance with defined storage conditions, after a storage time of one week and after a storage time of three weeks, were investigated. As to the storage conditions of the individual specimens, see the following listing:

Storage conditions 1: Desiccant, room temperature (RT; 23° C.), desiccator specimens M 1.1; M 2.1 and M 3.1
Storage conditions 2: Temperature 23° C., 50% relative humidity, climate cabinet M 1.2; M 2.2 and M 3.2
Storage conditions 3: Temperature 40° C., 80% relative humidity, climate cabinet M 1.3; M 2.3 and M 3.3

Prior to the illuminance measurement, the samples were each conditioned for an hour in the desiccator with desiccant at room temperature, in order to provide identical measuring conditions for the respective measurement series.

Figure 4:
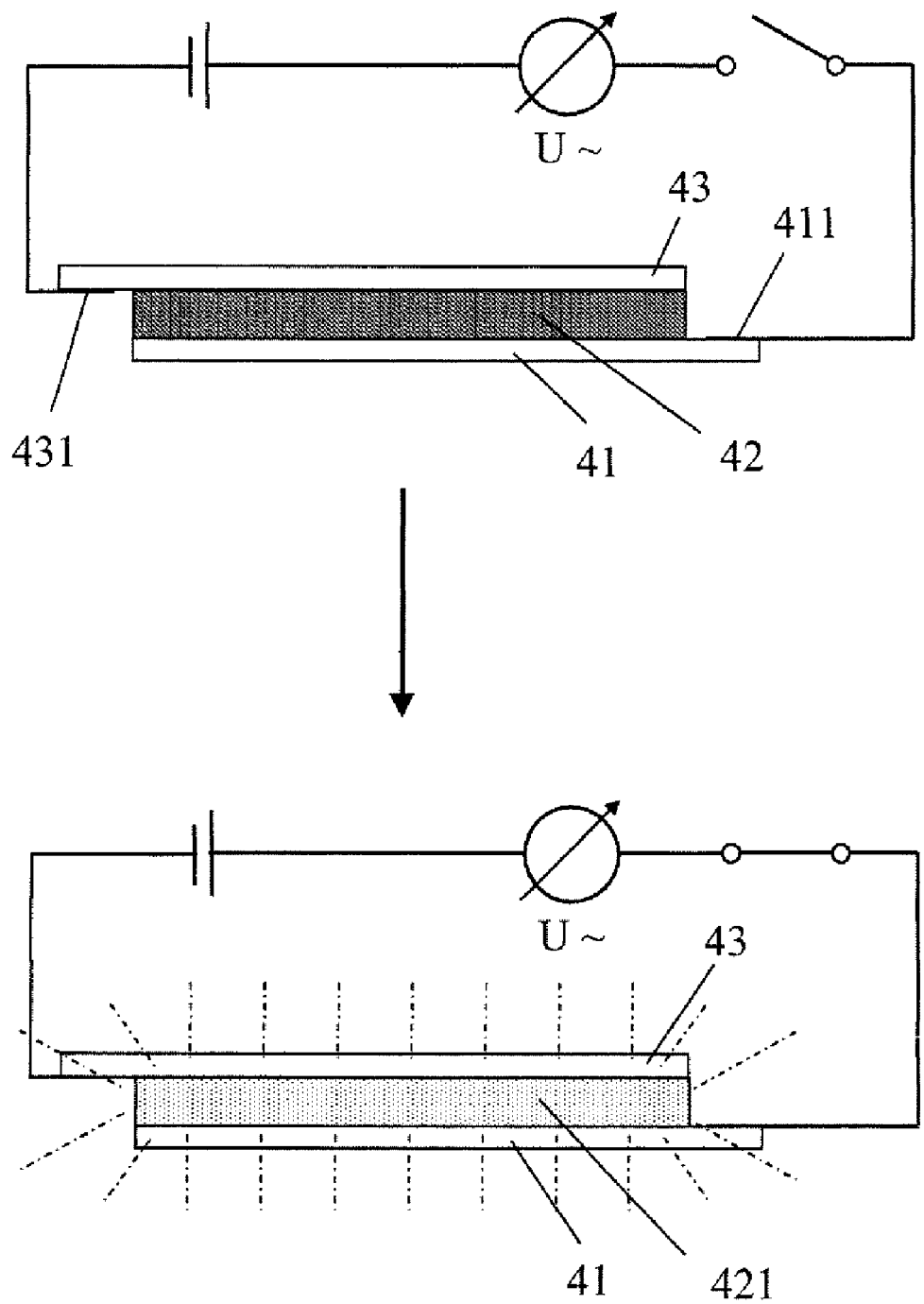
FIG. 4 shows a circuit for measuring illuminescence of a film comprising the adhesive of the present invention.

The measurement is carried out in a circuit like that of FIG. 4, bottom (41=bottom ITO film, 411=contacting of the bottom ITO layer, 43=top ITO layer, 431=contacting of the top ITO layer, 421=luminescent PSA). The measurements were made at room temperature, with the corresponding voltage and frequency figures as specified in table 2.

The illuminance was measured using a VOLTCRAFT light meter Lx-1108 with a standard measurement probe, with the measuring sensor placed beneath the sample specimen directly (no distance between sample specimen and measuring sensor), in the center, and with exclusion of ambient light. The figure in lux can be read off directly. The reading was taken 30 seconds after the voltage supply had been switched on, with appropriate frequency (display remaining constant).

Results

TABLE 1

Overview of adhesive properties:

| PSA | | Bond strength Test A | | Holding powers Test B | | |
| --- | --- | --- | --- | --- | --- | --- |
| Specimen | GG43 fraction* | Steel [N/cm] | PE [N/cm] | 23° C. [min.] | 40° C. [min.] | 70° C. [min.] |
| M 0 | — | 4.7 | 1.4 | >10000 | >10000 | >10000 |
| M 1 | 25.0% | 4.2 | 1.3 | >10000 | >10000 | >10000 |
| M 2 | 37.5% | 4.5 | 1.2 | >10000 | >10000 | >10000 |
| M 3 | 50.0% | 2.9 | 0.6 | >10000 | >10000 | >10000 |

| PSA | | Microshear test Test C1 | | | SAFT Test C2 | |
| --- | --- | --- | --- | --- | --- | --- |
| Specimen | GG43 fraction* | max. [µm] | min. [µm] | elast. [%] | Temperature [° C.] | Shear travel [µm] |
| M 0 | — | 19 | 5 | 74 | 200 | 1000 |
| M 1 | 25.0% | 14 | 5 | 64 | 200 | 678 |
| M 2 | 37.5% | 20 | 6 | 70 | 200 | 710 |
| M 3 | 50.0% | 10 | 4 | 60 | 200 | 678 |

*Electroluminescent additive, GlacierGLO ® GG43: copper-activated zinc sulfide

TABLE 2

Illuminance measurement:

| | | | fresh | | | 1 week | | | 3 weeks | | |
| --- | --- | --- | --- | --- | --- | --- | --- | --- | --- | --- | --- |
| | | | | | | M 1.1 dry n | M 1.2 23° C. 50% rh | M 1.3 40° C. 80% rh | M 1.1 dry n | M 1.2 23° C. 50% rh | M 1.3 40° C. 80% rh |
| | U [V] | f [Hz] | M 1.1 | M 1.2 | M 1.3 | [lx] | [lx] | [lx] | [lx] | [lx] | [lx] |
| 25% GG43* | 100 | 400 | 4 | 2 | 3 | | | | | | |
| | | 700 | 6 | 4 | 4 | | | | | | |
| | | 1000 | 8 | 6 | 6 | | | | | | |
| | 200 | 400 | 18 | 17 | 18 | | | | | | |
| | | 700 | 29 | 27 | 27 | 28 | 27 | 29 | 27 | 28 | 30 |
| | | 1000 | 36 | 34 | 35 | | | | | | |
| | 300 | 400 | 36 | 35 | 35 | | | | | | |
| | | 700 | 59 | 57 | 58 | | | | | | |
| | | 1000 | 79 | 73 | 73 | | | | | | |

| | | | fresh | | | 1 week | | | 3 weeks | | |
| --- | --- | --- | --- | --- | --- | --- | --- | --- | --- | --- | --- |
| | | | | | | M 2.1 dry n | M 2.2 23° C. 50% rh | M 2.3 40° C. 80% rh | M 2.1 dry n | M 2.2 23° C. 50% rh | M 2.3 40° C. 80% rh |
| | U [V] | f [Hz] | M 2.1 | M 2.2 | M 2.3 | [lx] | [lx] | [lx] | [lx] | [lx] | [lx] |
| 37.5% GG43* | 100 | 400 | 8 | 5 | 7 | | | | | | |
| | | 700 | 13 | 10 | 12 | | | | | | |
| | | 1000 | 18 | 14 | 16 | | | | | | |

TABLE 2-continued

Illuminance measurement:

| | U [V] | f [Hz] | fresh M 3.1 | fresh M 3.2 | fresh M 3.3 | 1 week M 3.1 dry n [lx] | 1 week M 3.2 23° C. 50% rh [lx] | 1 week M 3.3 40° C. 80% rh [lx] | 3 weeks M 3.1 dry n [lx] | 3 weeks M 3.2 23° C. 50% rh [lx] | 3 weeks M 3.3 40° C. 80% rh [lx] |
|---|---|---|---|---|---|---|---|---|---|---|---|
| | 200 | 400 | 45 | 39 | 43 | | | | | | |
| | | 700 | 69 | 62 | 66 | 67 | 64 | 70 | 66 | 66 | 73 |
| | | 1000 | 86 | 79 | 86 | | | | | | |
| | 300 | 400 | 89 | 84 | 86 | | | | | | |
| | | 700 | 140 | 130 | 135 | | | | | | |
| | | 1000 | 188 | 168 | 175 | | | | | | |
| 50% GG43* | 100 | 400 | 18 | 16 | 16 | | | | | | |
| | | 700 | 30 | 24 | 23 | | | | | | |
| | | 1000 | 36 | 32 | 31 | | | | | | |
| | 200 | 400 | 82 | 74 | 74 | | | | | | |
| | | 700 | 126 | 115 | 114 | 125 | 117 | 120 | 125 | 119 | 124 |
| | | 1000 | 162 | 150 | 148 | | | | | | |
| | 300 | 400 | 153 | 143 | 144 | | | | | | |
| | | 700 | 239 | 220 | 223 | | | | | | |
| | | 1000 | 311 | 286 | 287 | | | | | | |

*Electroluminescent additive, GlacierGLO ® GG43: copper-activated zinc sulfide
n = amount of electroluminescent additives in the PSA [figures in % by weight]
U = voltage [figures in volts],
f = frequency [figures in hertz];
rh = relative humidity
All illuminance figures in lux It was possible to show that the adhesive properties remain good even when electroluminescent additives are admixed (table 1). Only at very high levels of blending (sample 3) is a loss in bond strength (test A) observed; however, bond strength per se remains. On determination of the holding powers in accordance with test B it was not possible to find any change. In test B there is a slight improvement in shear strength, but all of the results were above the defined cutoff of 10 000 minutes. In the case of the SAFT test (C2) a slight improvement in short-term temperature resistance is found (shear travel at 200° C.).

The relationship between illuminance of the applied voltage and the frequency is shown by table 2 on the basis of the measurements for the fresh specimens. On the basis of the exemplary choice of the measurement parameters, voltage of 200 V, frequency of 700 Hz, it was possible to show for the three samples that, even after storage for one or three weeks, there is no observable loss in the electroluminescent properties. Consequently there is no significant aging of the specimens. In the edge regions as well, where the adhesive has direct contact with atmospheric humidity during storage, there were no resultant halos or defects. The luminosity in fact appears to have risen slightly as the storage temperature and storage humidity went up.

The PSAs of the invention are therefore outstandingly suitable for providing self-lighting and self-adhesive layers. When the PSAs of the invention are brought into an alternating electrical field, the PSAs display the phenomenon of electroluminescence. See FIG. 4, top: there is no alternating electrical field. 41=bottom ITO film, 411=contacting of the bottom ITO layer, 42=PSA (not luminescent without alternating field), 43=top ITO layer, 431=contacting of the top ITO layer.

The status following application of an alternating electrical field is shown by FIG. 4, bottom: 421=PSA, luminous in the alternating electrical field (symbolized by lighter color and circle of rays) (dot-dash lines; _____ ).

The luminosity of the PSA can be regulated as a result of the fraction of electroluminescent additives in the PSA and through the strength and the frequency of the alternating electrical field. Hence it is possible to use the PSA itself to illuminate the electronic components (more particularly the LC displays) in the context more particularly of use in the electronics industry, for example as a PSA for the bonding of LC displays, the illuminance being adaptable to the particular light conditions through control of the applied electrical field, thereby guaranteeing optimum recognition of the display at any time. The functions of adhesive bonding and of illumination are therefore united in the PSA.

The PSAs of the invention may be provided, for example, in the form of the pure electroluminescent PSA on a temporary carrier (release paper, liner or the like). The user then has the possibility of laminating his or her electroluminescent system onto any desired substrates, without solvent and without further need for drying and/or crosslinking systems.

A further advantageous form of provision is available by laminating or coating the electroluminescent PSA onto one side of an optically transmissive, electrically conductive carrier (an ITO film, for example). The user thus has the possibility of adhering the single-sided pressure-sensitive adhesive system to virtually any electrically conductive material. It would be possible, for example, for the user to adhere a display illumination system directly onto the electrically conductive base (comprising, for example, a plastic made electrically conductive accordingly, by filling with carbon black, by vapor deposition of metal, or otherwise, for example), thereby saving on operating steps and on the adhesive transfer tape typically required for bonding.

Two further advantageous variants of provision, belonging to the invention, are the assembly of two ITO films enclosing a layer of the PSA of the invention, and the assembly of an ITO film, an optically reflecting substrate, and a layer of the PSA of the invention between the ITO film and the substrate.

The invention claimed is:

1. A crosslinked polyacrylate-based pressure-sensitive adhesive (PSA) comprising at least one electroluminescent additive, wherein the fraction of the electroluminescent additives in the polyacrylate-based PSA, based on the additized PSA, is between 25% to 60% by weight.

2. The pressure-sensitive adhesive of claim 1, comprising an elastic component which is at least 40%.

3. The pressure-sensitive adhesive of any claim 1 wherein the PSA is substantially transparent at least in the visible range.

4. The pressure-sensitive adhesive of claim 1 wherein the electroluminescent additive is encapsulated.

5. The pressure-sensitive adhesive of claim 1 wherein the minimum illuminance at 200 V/700 Hz is 15lx.

6. The pressure sensitive adhesive of claim 5 wherein the minimum illuminance at 200 V/700 Hz is 30lx.

7. The pressure sensitive adhesive of claim 6 wherein the minimum illuminance at 200 V/700 Hz is 70lx.

8. The pressure-sensitive adhesive of claim 1 wherein the maximum deviation in the illuminance after storage is not more than ±20%.

9. The pressure sensitive adhesive of claim 8 wherein the maximum deviation in the illuminance after storage is not more than ±10%.

10. The pressure sensitive adhesive of claim 9 wherein the maximum deviation in the illuminance after storage is not more than ±5%.

11. The pressure sensitive adhesive of claim 1 wherein the fraction of the electroluminescent additives in the PSA, based on the additized PSA, is at least 37.5% by weight.

12. The pressure sensitive adhesive of claim 11 wherein the fraction of the electroluminescent additives in the PSA, based on the additized PSA, is at least 50% by weight.

13. An adhesive tape comprising a crosslinked polyacrylate-based pressure-sensitive adhesive comprising at least one electroluminescent additive, wherein the fraction of the electroluminescent additives in the polyacrylate-based PSA, based on the additized PSA, is between 25% to 60% by weight.

14. A pressure-sensitive adhesive comprising at least one electroluminescent additive, wherein optical brighteners have been admixed to the pressure-sensitive adhesive.

15. The pressure-sensitive adhesive of claim 14 wherein the optical brighteners are admixed to the pressure-sensitive adhesive with a degree of filling of up to 5% by weight.

16. The pressure sensitive adhesive of claim 14 wherein the optical brighteners are selected from the group consisting of stilbene derivatives, ethylene derivatives, coumarin derivatives, naphthalimide derivatives and pyrazole derivatives.

17. The pressure-sensitive adhesive of claim 14 wherein color pigments are admixed to the pressure-sensitive adhesive.

18. The pressure sensitive adhesive of claim 17 wherein the color pigments are selected from the group consisting of azo pigments, mineral color pigments and tea color pigments.

19. The pressure-sensitive adhesive of claim 17 wherein the color pigments are admixed to the pressure-sensitive adhesive with a degree of filling of up to 5% by weight.

20. The pressure-sensitive adhesive of claim 17 wherein zinc oxide, titanium dioxide, silicon dioxide and/or zirconium dioxide are admixed as color pigments to the pressure-sensitive adhesive.

* * * * *